United States Patent
Flawn et al.

(10) Patent No.: US 9,939,892 B2
(45) Date of Patent: Apr. 10, 2018

(54) METHOD AND SYSTEM FOR CUSTOMIZABLE MULTI-LAYERED SENSORY-ENHANCED E-READING INTERFACE

(71) Applicant: Rakuten Kobo Inc., Toronto (CA)

(72) Inventors: Sarah Flawn, Toronto (CA); Benjamin Landau, Toronto (CA)

(73) Assignee: Rakuten Kobo Inc., Toronto (CA)

( * ) Notice: Subject to any disclaimer, the term of this patent is extended or adjusted under 35 U.S.C. 154(b) by 0 days.

(21) Appl. No.: 14/570,832

(22) Filed: Dec. 15, 2014

(65) Prior Publication Data

US 2016/0170484 A1    Jun. 16, 2016

(51) Int. Cl.
| | | |
|---|---|---|
| G06F 3/01 | (2006.01) | |
| G06F 3/03 | (2006.01) | |
| G06K 9/00 | (2006.01) | |
| G06T 7/20 | (2017.01) | |
| G06F 3/0488 | (2013.01) | |
| G06F 3/0483 | (2013.01) | |

(52) U.S. Cl.
CPC .............. *G06F 3/013* (2013.01); *G06F 3/016* (2013.01); *G06F 3/0304* (2013.01); *G06F 3/0483* (2013.01); *G06F 3/0488* (2013.01); *G06K 9/0061* (2013.01); *G06K 9/00617* (2013.01); *G06T 7/20* (2013.01)

(58) Field of Classification Search
CPC ............................................. G09B 5/06–5/062
USPC ................................................. 345/156–184
See application file for complete search history.

(56) References Cited

U.S. PATENT DOCUMENTS

| | | | | |
|---|---|---|---|---|
| 9,141,257 B1* | 9/2015 | Goldstein | ............... | G06F 3/167 |
| 2010/0164894 A1* | 7/2010 | Kim | ........................ | G06F 3/016 |
| | | | | 345/173 |
| 2010/0318362 A1* | 12/2010 | Kurzweil | ............... | G10L 13/00 |
| | | | | 704/260 |
| 2011/0126119 A1* | 5/2011 | Young et al. | ................. | 715/744 |
| 2013/0027302 A1* | 1/2013 | Iwaizumi et al. | .... | G06F 1/1686 |
| | | | | 345/158 |
| 2013/0209981 A1* | 8/2013 | Newell | ........................ | 434/317 |
| 2014/0038154 A1 | 2/2014 | Brownlow et al. | | |

OTHER PUBLICATIONS

Flawn, U.S. Appl. No. 14/553,522, filed Nov. 25, 2014.
Flawn, et al., U.S. Appl. No. 14/570,609, filed Dec. 15, 2014.
Landau, et al., U.S. Appl. No. 14/570,772, filed Dec. 15, 2014.
Liu, U.S. Appl. No. 14/533,700, filed Nov. 5, 2014.
Liu, U.S. Appl. No. 14/533,890, filed Nov. 5, 2014.

* cited by examiner

*Primary Examiner* — Koosha Sharifi-Tafreshi
*Assistant Examiner* — Sarvesh J Nadkarni
(74) *Attorney, Agent, or Firm* — Oblon, McClelland, Maier & Neustadt, L.L.P.

(57) ABSTRACT

A method of synchronizing multi-sensory enhancement with e-reading content is provided. The method includes tracking eye movement of a user of an e-reader, providing a customizable multi-sensory indicator embedded within a portion of a story presented on the e-reader and responsive to the eye movement of the user being correlated with the customizable multi-sensory indicator, providing a user customized multi-sensory enhancement which is associated with the portion of the story presented on the e-reader.

23 Claims, 6 Drawing Sheets

METHOD AND SYSTEM FOR CUSTOMIZABLE MULTI-LAYERED SENSORY-ENHANCED E-READING INTERFACE

CROSS-REFERENCE TO RELATED APPLICATIONS

This application is related to co-pending U.S. patent application Ser. No. 14/533,890, filed on Nov. 5, 2014, entitled "PROVIDING A SCENT WHILE A USER INTERACTS WITH AN ELECTRONIC MEDIA PROVIDING DEVICE," by Liu et al., and assigned to the assignee of the present application and hereby incorporated by reference in its entirety.

This application is related to co-pending U.S. patent application Ser. No. 14/533,700, filed on Nov. 5, 2014, entitled "OPERATING AN ELECTRONIC PERSONAL DISPLAY USING EYE MOVEMENT TRACKING," by Liu, and assigned to the assignee of the present application and hereby incorporated by reference in its entirety.

This application is related to co-pending U.S. patent application Ser. No. 14/553,522, filed on Nov. 25, 2014, entitled "AUDIO IN SYNCHRONIZED OPERATION WITH E-READING CONTENT," by Flawn et al., and assigned to the assignee of the present application and hereby incorporated by reference in its entirety.

This application is related to co-pending U.S. patent application Ser. No. 14/570,609, filed on Dec. 15, 2014, entitled "METHOD AND SYSTEM FOR VISUALLY-BIASED SENSORY-ENHANCED E-READING," by Flawn et al., assigned to the assignee of the present application and hereby incorporated by reference in its entirety.

This application is related to co-pending U.S. patent application Ser. No. 14/570,772, filed on Dec. 15, 2014, entitled "METHOD AND SYSTEM FOR TACTILE-BIASED SENSORY-ENHANCED E-READING," by Landau et al., assigned to the assignee of the present application and hereby incorporated by reference in its entirety.

TECHNICAL FIELD

Examples described herein relate to a system and method for operating a computing device in providing a multi-sensory enhancement interface for digital reading (e-reading).

BACKGROUND

An electronic personal display is a mobile computing device that displays information to a user. While an electronic personal display may be capable of many of the functions of a personal computer, a user can typically interact directly with an electronic personal display without the use of a keyboard that is separate from, or coupled to, but distinct from the electronic personal display itself. Some examples of electronic personal displays include mobile digital devices/tablet computers and electronic readers (e-readers) such (e.g., Apple iPad®, Microsoft® Surface™ Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, Kobo Aura H2O, Kobo GLO and the like).

Some electronic personal display devices are purpose built devices designed to perform especially well at displaying digitally stored content for reading or viewing thereon. For example, a purpose build device may include a display that reduces glare, performs well in high lighting conditions, and/or mimics the look of text as presented via actual discrete pages of paper. While such purpose built devices may excel at displaying content for a user to read, they may also perform other functions, such as displaying images, emitting audio, recording audio, and web surfing, among others.

Electronic personal displays are among numerous kinds of consumer devices that can receive services and utilize resources across a network service. Such devices can operate applications or provide other functionality that links a device to a particular account of a specific service. For example, the electronic reader (e-reader) devices typically link to an online bookstore, and media playback devices often include applications that enable the user to access an online media electronic library (or e-library). In this context, the user accounts can enable the user to receive the full benefit and functionality of the device.

Yet further, such devices may incorporate a touch screen display having integrated touch sensors and touch sensing functionality, whereby user input commands via touch-based gestures are received thereon.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION

Figure 1:
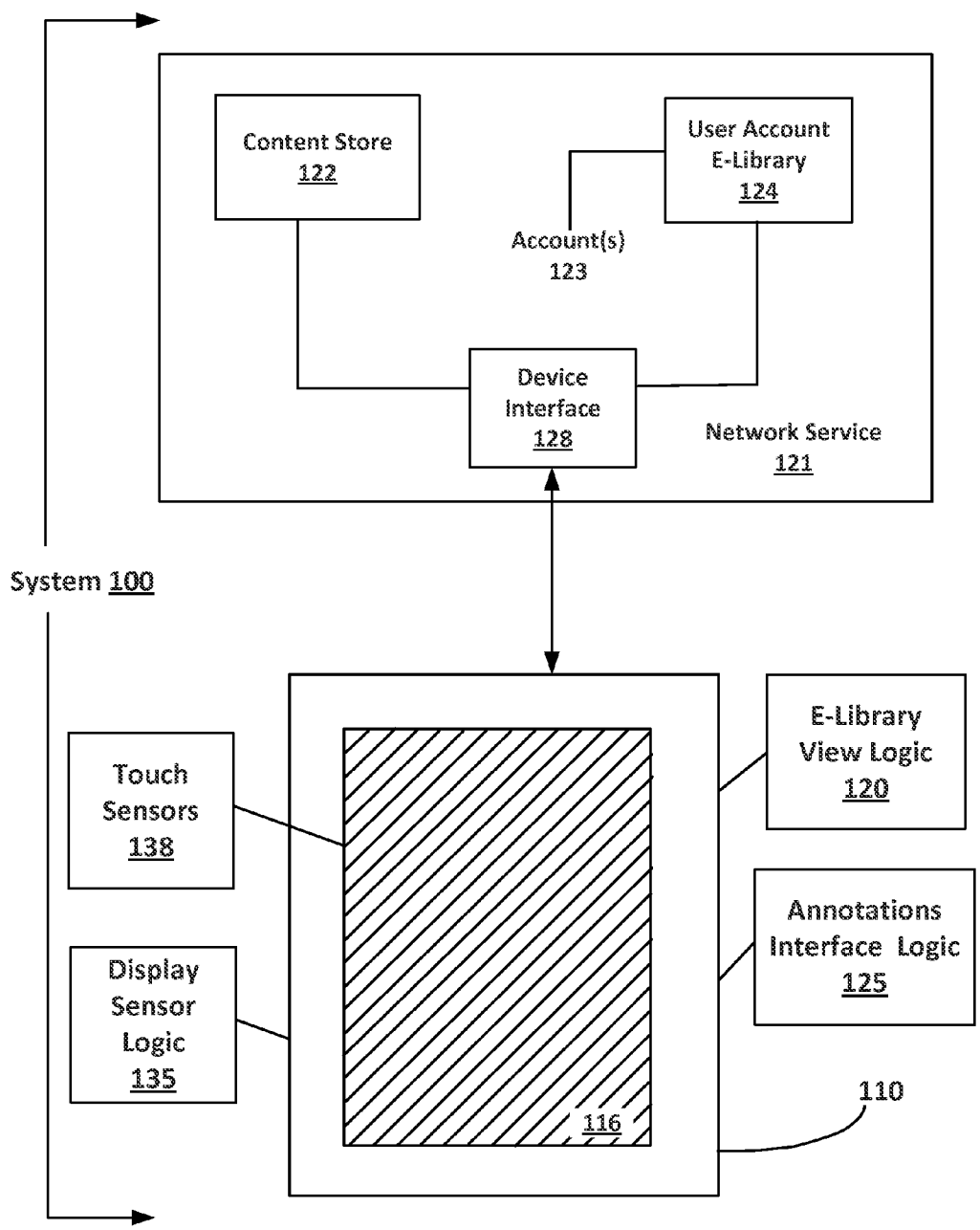
FIG. 1 illustrates a system utilizing applications and providing e-book services on a computing device configured for operation of an e-book reading launch interface, in an embodiment.

Embodiments include a fully immersive, multi-sensory reading experience on any device with this multi-layered sensory-driven reading experience. Embodiments include an interface by which booklovers will be able to customize their e-reading experience using multiple levels of immersive, sensory-enhanced reading options (comprising sound, sight, scent and touch).

The interface allows users to experience all, or any combination of layers of sensory-enhancements. These would be configurable for the reading mode or in the e-library before selecting a book. It could be especially popular with children, readers of genre-fiction (horror, romance, action), and graphic novels/comics/manga.

SOUND: When a reader comes across a specific word of interest, a sound corresponding to that word, could automatically be triggered. In a horror book, the word "thunder" would prompt a sound of thunder cracking in the distance.

In a novel about pirates, the sound corresponding to "boat" could be sound of waves crashing against the hull of a boat.

SIGHT: When reaching the climax of horror novel (end of chapter or end of book) or when triggering a specific word such as "murder" or "blood" a faint red light, or blotches of red light could begin pulsating behind the text.

SCENT: While adding technology directly into a reading device designed to produce certain experience-enhancing scents would probably not warrant the added costs, users who want the option, could buy accessories with built-in scent sprays—triggered at certain moments in a book or made specific for different genres that could be part of the multi-layered sensory-driven reading experience feature.

TACTILE: Using the same technology that enables vibrate on mobile phones and tablets, users could choose to "enable touch enhanced mode" and feel vibrations or other motions while reading. Like the sound option outlined above, specific words could trigger corresponding motions. When a user reads the word "boat" the device could perform a rolling movement (using vibrations) to help the reader feel like they're on the rolling ocean. When coming across the word "footsteps" the user could feel alternating vibrations moving up either side of the page little feet walking up their device.

Embodiments include eye tracking while e-reading and providing visual enhancements based on the eye tracking. In one embodiment, booklovers will be able to select an immersive reading experience based on multi-sensory sensory enhancements. For example, when reaching the climax of a horror novel (end of chapter or end of book) or when triggering a specific word such as "murder" or "blood" a faint red light, or blotches of red light could begin pulsating and may be vibrating behind the text.

The eye-tracking technology of co-pending U.S. patent application Ser. No. 14/533,700, filed on Nov. 5, 2014, entitled "OPERATING AN ELECTRONIC PERSONAL DISPLAY USING EYE MOVEMENT TRACKING," by Liu, and assigned to the assignee of the present application and hereby incorporated by reference in its entirety, enables certain words to trigger corresponding, immersion-enhancing motions.

Embodiments described herein provide a multi-sensor enhancement, for example, when a user reads the word "boat" the device could perform a rolling movement (using vibrations) to help the reader feel like they're on the rolling ocean. When coming across the word "footsteps" the user could feel alternating vibrations moving up either side of the page little feet walking up their device. The intensity and frequency of these word-triggered vibrations could be controlled in the setting section of the feature or could be turned off completely.

"E-books" are a form of electronic publication content stored in digital format in a computer non-transitory memory, viewable on a computing device having display functionality. An e-book can correspond to, or mimic, the paginated format of a printed publication for viewing, such as provided by printed literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., specialized e-reading application software) to view e-books in a format that mimics the paginated printed publication. Still further, some devices (sometimes labeled as "e-readers") can display digitally-stored content in a more reading-centric manner, while also providing, via a user input interface, the ability to manipulate that content for viewing, such as via discrete pages arranged sequentially (that is, pagination) corresponding to an intended or natural reading progression, or flow, of the content therein.

An "e-reading device", variously referred to herein as an electronic personal display or mobile computing device, can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet computer device, an ultra-mobile computing device, or a wearable computing device with a form factor of a wearable accessory device (e.g., smart watch or bracelet, glass-wear integrated with a computing device, etc.). As another example, an e-reading device can include an e-reader device, such as a purpose-built device that is optimized for an e-reading experience (e.g., with E-ink displays).

While conventional physical paper books typically include a fixedly-configured table of contents page(s) intended to assist a user or observer to locate a desired portion or page of the book for reading, a digitally rendered e-book may be configured in other, more fluid arrangements that allow alternative ways for a user to conveniently access a particular content portion or page of the e-book.

FIG. 1 illustrates a system 100 for utilizing applications and providing e-book services on a computing device configured for operation of an e-book reading launch interface, according to an embodiment. In an example of FIG. 1, system 100 includes an electronic personal display device, shown by way of example as an e-reading device 110, and a network service 121. The network service 121 can include multiple servers and other computing resources that provide various services in connection with one or more applications that are installed on the e-reading device 110. For example, in one embodiment, the network service 121 may provide multi-sensory enhancements that correspond with e-reading content. By way of example, in one implementation, the network service 121 can provide e-book services that communicate with the e-reading device 110. The e-book services provided through network service 121 can, for example, include services in which e-books are sold, shared, downloaded and/or stored. More generally, the network service 121 can provide various other content services, including content rendering services (e.g., streaming media) or other network application environments or services.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reader application that links the device to the network service 121 and enables e-books provided through the service to be viewed and consumed by way of e-reading. In another implementation, the e-reading device 110 can run a media playback or streaming application that receives files or streaming data from the network service 121. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 121 can include a device interface 128, a content store 122 and a user account electronic library (e-library) 124 storing e-books or digital content items. Content store 122 may be an online store for purchasing of digital content items for download therefrom onto a resident memory of e-reading device 110 and/or user account e-library 124. User account e-library 124 associates the e-reading device 110 with a user having an account 123. The account 123 can also be associated with ownership of, and/or accessibility to, one or more digital content items stored in content store 122. In one embodiment, the digital content items are e-books, and the content store 122 is an online store having e-books for purchase or other licensed use. The device interface 128 can handle requests from the e-reading device 110 with regard to services and functionality of the network service 121. The device interface 128 can utilize information provided with user account 123 in order to enable services, such as purchasing and downloading of e-books into user account e-library 124, and determining what e-books and content items providable via content store 122 are associated with, and accessible to, user account 123. Additionally, the device interface 128 can provide the e-reading device 110 with access to the online content store 122. The device interface 128 can handle input to identify content items (e.g., e-books), and further to link content items to the account 123 of the user.

Yet further, the user account e-library 124 can retain metadata for individual accounts 123 to identify e-books or other digital content items that have been purchased or made available for consumption for a given account. Thus information relating to e-books within user account e-library 124 can include a metadata set in addition to substantive digital text and image content portions. The metadata set can include, for example, information such as the graphic representation of the e-book, such as including artwork- or image-based representation of a counterpart physical paper book cover, as well as summary information, author information, title, short synapse or book review, publication date and language of the e-book, and book or volume series information.

The e-reading device 110 may be associated with the user account 123, and multiple devices may be associated with the same account. As described in greater detail below, e-reading device 110 can locally store content items (e.g., e-books) that are purchased or otherwise made available to the user of the e-reading device 110 as well as to archive, in user account 124, e-books and other digital content items that have been purchased for the user account 123, but are not necessarily stored in local resident memory of computing device 110.

With reference to an example of FIG. 1, e-reading device 110 can include a touchscreen display 116. In an embodiment, the display screen 116 is touch-sensitive, to process touch inputs including gestures (e.g., swipes). For example, the display screen 116 may be integrated with one or more touch sensors 138 to provide a touch-sensing region on a surface of the display screen 116. For some embodiments, the one or more touch sensors 138 may include capacitive sensors that can sense or detect a human body's capacitance as input. In the example of FIG. 1, the touch-sensing region coincides with a substantial surface area, if not all, of the display screen 116.

In some embodiments, the e-reading device 110 includes features for providing functionality related to displaying paginated content, including paginated content comprising an e-magazine or e-comic book. The e-reading device 110 can include page transitioning logic, which enables the user to transition through paginated content. The e-reading device 110 can display pages of e-books, e-magazines and e-comics, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. Page transitioning logic can operate to enable the user to transition from a given page state to another page state In the specific example embodiment where a given page state coincides with a single page, for instance, each page state corresponding to one page of the digitally constructed, ordered sequence of pages paginated to comprise, in one embodiment, an e-book. In some implementations, the page transitioning logic enables single page transitions, chapter transitions, or cluster transitions (multiple pages at one time).

According to some embodiments, the e-reading device 110 includes display sensor logic 135 to detect and interpret user input or user input commands made through interaction with the touch sensors 138. By way of example, display sensor logic 135 can detect a user making contact with the touch-sensing region of the display screen 116, otherwise known as a touch event. More specifically, display sensor logic 135 can detect a touch events also referred to herein as a tap, an initial tap held in contact with display screen 116 for longer than some pre-defined threshold duration of time (otherwise known as a "long press" or a "long touch"), multiple taps performed either sequentially or generally simultaneously, swiping gesture actions made through user interaction with the touch sensing region of the display screen 116, or any combination of these gesture actions. Although referred to herein as a "touch" or a tap, it should be appreciated that in some design implementations, sufficient proximity to the screen surface, even without actual physical contact, may register a "contact" or a "touch event". Furthermore, display sensor logic 135 can interpret such interactions in a variety of ways. For example, each such interaction may be interpreted as a particular type of user input associated with a respective input command, execution of which may trigger a change in state of display 116.

In one implementation, display sensor logic 135 implements operations to monitor for the user contacting or superimposing upon, using a finger, thumb or stylus, a surface of display 116 coinciding with a placement of one or more touch sensor components 138, that is, a touch event, and also detects and correlates a particular gesture action (e.g., pinching, swiping, tapping, etc.) as a particular type of input command. Display sensor logic is also responsive to the user's eye contact with various words or text that may initiate presentation of multi-sensory enhancements that correspond with e-reading content. Display sensor logic 135 may also sense directionality of a user gesture action so as to distinguish between, for example, leftward, rightward, upward, downward and diagonal swipes along a surface portion of display screen 116 for the purpose of associating respective user input commands therewith.

E-library view (or interface) logic 120 provides an interface, displayable via display screen 116 of computing device 110, showing titles in a user's e-library collection of e-books, or from a user's home page in relation to an online content store 122 hosting e-books for commercial sale and downloading therefrom. The e-library collection of e-books may be hosted via a remotely located computer server device associate with user account e-library 124, or at a locally resident within a memory at computing device 110. The e-library view logic 120 can display iconic or other graphic representations of individual e-books in the user's e-library collection. For example, the e-library view logic 120 can use the metadata associated with the records of the e-books in the user's e-library account 124 to display lists, folders, or other virtual structures that include graphic representations and/or other identifiers of e-books in the user's collection. The metadata set can include, for example, information such as the graphic representation of the e-book, such as including artwork- or image-based representation of a counterpart physical paper book cover, as well as summary information, author information, title, short synapse or book review, publication date and language of the e-book, and book or volume series information. The user's collection can include e-books that the user has on the particular device 110 (e.g., locally stored e-books), as well as e-books that are not locally stored, but rather are stored or archived at a remote computer server and associated with the user account e-library 124.

Annotations interface logic module 125 provides an annotations and bookmarking scheme in conjunction with the interface rendered via e-library view logic 120, providing an annotations interface page(s) to be deployed upon launch in lieu of a table of contents or a first page of an e-book for reading. Launch of the e-book for reading, in one embodiment, is triggered by a user enacting a touch event upon a graphical icon representing a specific e-book from an e-library collection, as will be described further in regard to FIGS. 2 and 3.

E-library view logic module 120 and annotations interface logic module 125 can be implemented as software modules comprising instructions stored in a memory of mobile computing device 110, as described in further detail below with regard to FIG. 2.

In one or more embodiments of e-library view logic module 120, display sensor logic 135 and annotations interface logic module 125 described herein may be implemented using programmatic modules or components. A programmatic module or component may include a program, a subroutine, a portion of a program, or a software or a hardware component capable of performing one or more stated tasks or functions in conjunction with one or more processors. As used herein, a module or component can exist on a hardware component independently of other modules or components. Alternatively, a module or component can be a shared element or process of other modules, programs and hardware components.

Furthermore, the one or more embodiments of e-library view logic module 120, display sensor logic 135 and annotations interface logic module 125 described herein may be implemented through instructions that are executable by one or more processors. These instructions may be stored on a computer-readable non-transitory medium. In particular, the numerous computing and communication devices shown with embodiments of the invention include processor(s) and various forms of computer memory, including volatile and non-volatile forms, storing data and instructions. Examples of computer-readable mediums include permanent memory storage devices, such as hard drives on personal computers or servers. Other examples of computer storage mediums include portable storage units, flash or solid-state memory (such as included on many cell phones and consumer electronic devices) and magnetic memory. Computers, terminals, network enabled devices (e.g., mobile devices such as cell phones and wearable computers) are all examples of machines and devices that utilize processors, memory, and instructions stored on computer-readable mediums. Additionally, embodiments may be implemented in the form of computer-programs, or a computer usable storage medium capable of storing such a program.

Figure 2:
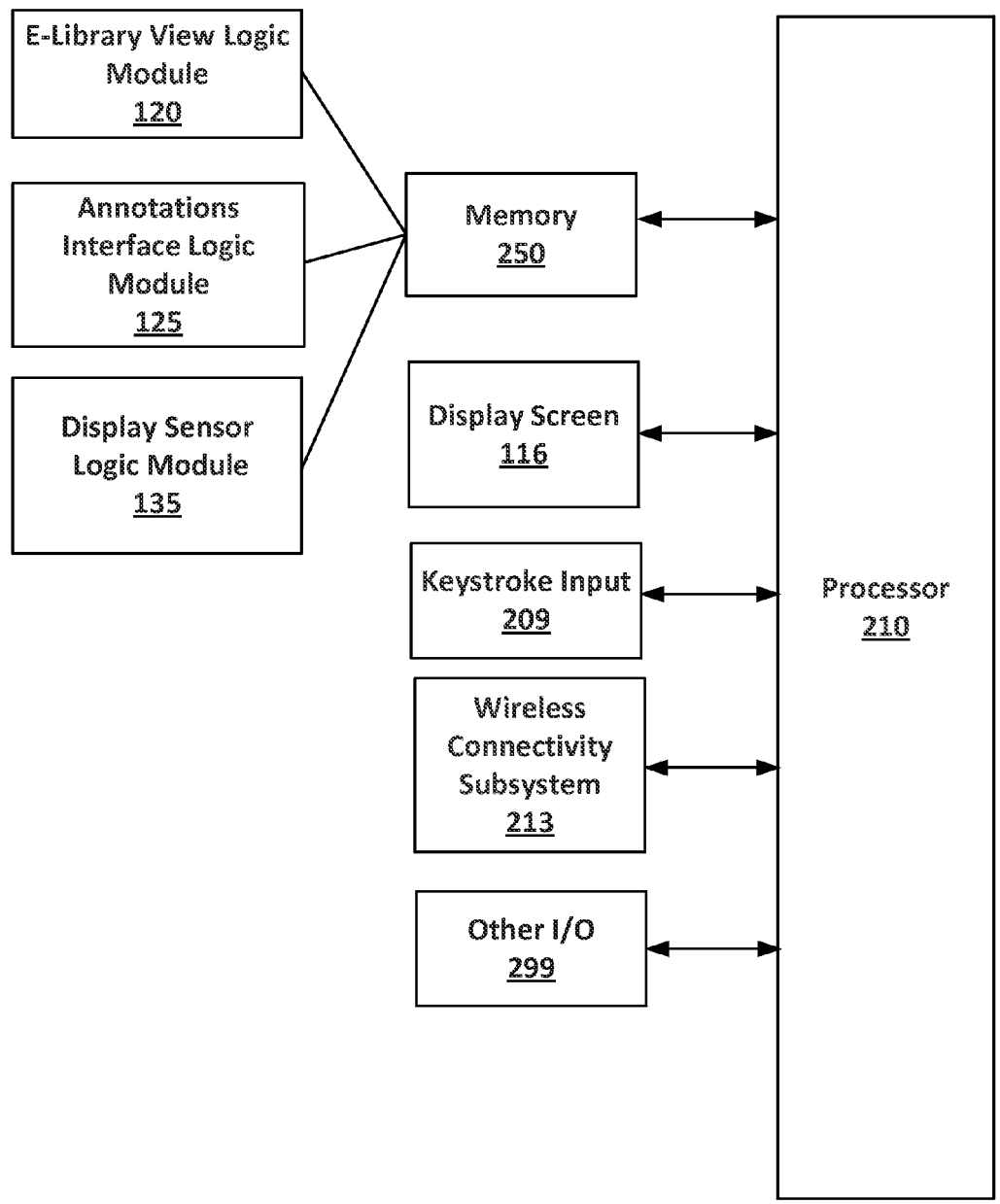
FIG. 2 illustrates a schematic architecture of a computing device for configuring and launching an e-book reading interface, according to an embodiment.

FIG. 2 illustrates a schematic architecture of a computing device for configuring and launching an e-book reading interface, according to an embodiment.

E-reading device 110 further includes processor 210, a memory 250 storing instructions and logic pertaining at least to display sensor logic 135, e-library view logic module 120 and annotations interface logic 125.

Processor 210 can implement functionality using the logic and instructions stored in memory 250. Additionally, in some implementations, processor 210 communicates with the network service 121 (see FIG. 1). More specifically, the e-reading device 110 can access the network service 121 to receive various kinds of resources (e.g., digital content items such as e-books, configuration files, account information), as well as to provide information (e.g., user account information, service requests etc.). For example, e-reading device 110 can receive application resources, such as e-books or media files, that the user elects to purchase or otherwise download via the network service 121. The application resources that are downloaded onto the e-reading device 110 can be stored in memory 250.

In some implementations, display 116 can correspond to, for example, a liquid crystal display (LCD) or light emitting diode (LED) display that illuminates in order to provide content generated from processor 210. In some implementations, display 116 can be touch-sensitive. For example, in some embodiments, one or more of the touch sensor components 138 may be integrated with display 116. In other embodiments, the touch sensor components 138 may be provided (e.g., as a layer) above or below display 116 such that individual touch sensor components 138 track different regions of display 116. Further, in some variations, display 116 can correspond to an electronic paper type display, which mimics conventional paper in the manner in which content is displayed. Examples of such display technologies include electrophoretic displays, electro-wetting displays, and electro-fluidic displays.

Processor 210 can receive input from various sources, including touch sensor components 138, display 116, keystroke input 208 such as from a virtual or rendered keyboard, and other input mechanisms 299 (e.g., buttons, mouse, microphone, etc.). With reference to examples described herein, processor 210 can respond to input detected at the touch sensor components 138. In some embodiments, processor 210 responds to inputs from the touch sensor components 138 in order to facilitate or enhance e-book activities such as generating e-book content on display 116, performing page transitions of the displayed e-book content, powering off the device 110 and/or display 116, activating a screen saver, launching or closing an application, and/or otherwise altering a state of display 116.

In some embodiments, memory 250 may store display sensor logic 135 that monitors for user interactions detected through the touch sensor components 138, and further processes the user interactions as a particular input or type of input. In an alternative embodiment, display sensor logic module 135 may be integrated with the touch sensor components 138. For example, the touch sensor components 138 can be provided as a modular component that includes integrated circuits or other hardware logic, and such resources can provide some or all of display sensor logic

135. In variations, some or all of display sensor logic 135 may be implemented with processor 210 (which utilizes instructions stored in memory 250), or with an alternative processing resource.

E-reading device 110 further includes wireless connectivity subsystem 213, comprising a wireless communication receiver, a transmitter, and associated components, such as one or more embedded or internal antenna elements, local oscillators, and a processing module such as a digital signal processor (DSP) (not shown). As will be apparent to those skilled in the field of communications, the particular design of wireless connectivity subsystem 213 depends on the communication network in which computing device 110 is intended to operate, such as in accordance with Wi-Fi, Bluetooth, Near Field Communication (NFC) communication protocols, and the like.

E-library view logic module 120 can be implemented as a software module, comprising instructions stored in memory 250, on mobile computing device 110. In one implementation, the local memory 250 can include records for each e-book in the user's e-library account 124, each record include metadata of the e-books therein. The user may have the content portion of select e-books archived remotely at a computer server cloud system, so as not to reside in the local memory 250, but be provided by the network service 121 upon request or as needed. By way of example, the e-library view logic module 120 can display the e-books of a user's collection in the form of a virtual bookshelf or bookcase feature showing graphical icons representing the e-books. In such an implementation, the e-books are displayed as icons that include imagery, title information, etc. In a variation, the e-library view module 120 can display representations of e-books in the user's collection as icons, or as icons with associated text. Still further, folders can be used to provide a panel view of the graphic representations (e.g., icons and/or text) of the e-books in the user's e-library collection 124, corresponding to a side view of a bookshelf showing book spines with titles printed thereon for identifying individual books.

Annotations interface logic 125 can be implemented as a software module comprising instructions stored in memory 250 of computing device 110. Annotations interface logic module 125 provides a provides an annotations and bookmarking interface scheme in conjunction with e-library view logic 120, configuring an annotations interface page(s), which can be deployed upon a subsequent launch of an e-book for reading. In embodiment, upon e-book launch for reading, the annotations interface page can be presented in lieu of a typical table of contents or a first substantive reading page. Launch of the e-book for reading may be triggered by a user enacting a touch event upon a graphical icon representing a specific e-book from e-library collection 124 as displayed on display screen 116 via e-library view logic 120.

Figure 3A:
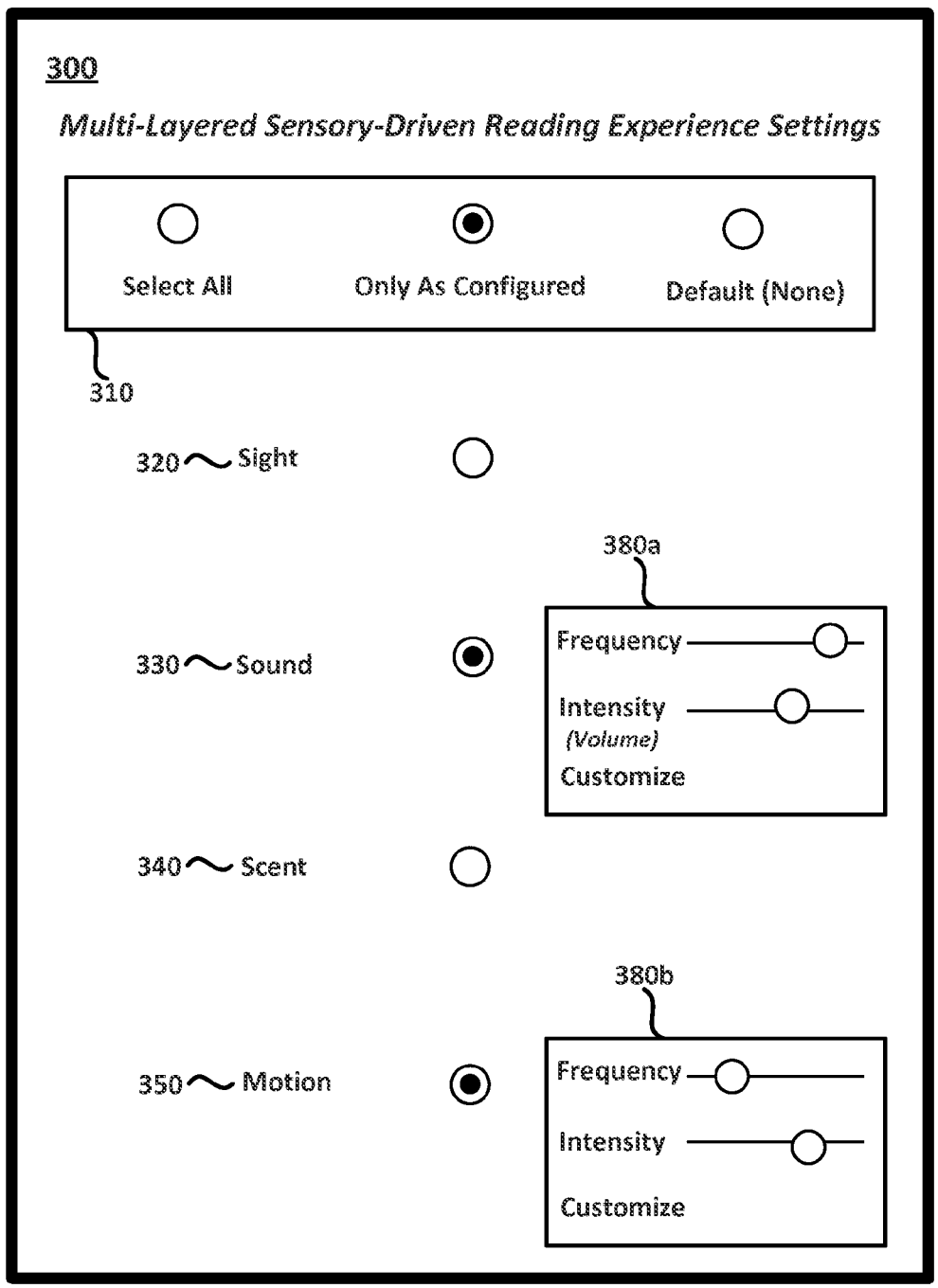
FIGS. 3a and 3b illustrate example embodiments for customizable multi-sensory enhanced e-reading.

FIG. 3a illustrates an embodiment of providing a customizable interface 300 for customizing a multi-sensory enhanced e-reading experience. Embodiments include a fully immersive, multi-sensory reading experience on any device with this multi-layered sensory-driven reading experience. Embodiments include an interface 300 by which booklovers will be able to customize their e-reading experience using multiple levels of immersive, sensory-enhanced reading options (comprising sound, sight, scent and touch).

Interface 300 includes experience settings 310 that enable a user to "select all" options, select options, "as configured" and to select a "default" option. The interface allows users to experience all, or any combination of layers of sensory-enhancements. These would be configurable for the reading mode or in the e-library before selecting a book. It could be especially popular with children, readers of genre-fiction (horror, romance, action), and graphic novels/comics/manga.

With sound 330, when a reader comes across a specific word of interest, a sound corresponding to that word could automatically be triggered. For example, with a horror book, the word "thunder" would prompt a sound of thunder cracking in the distance. In a novel about pirates, the sound corresponding to "boat" could be sound of waves crashing against the hull of a boat.

Figure 3B:
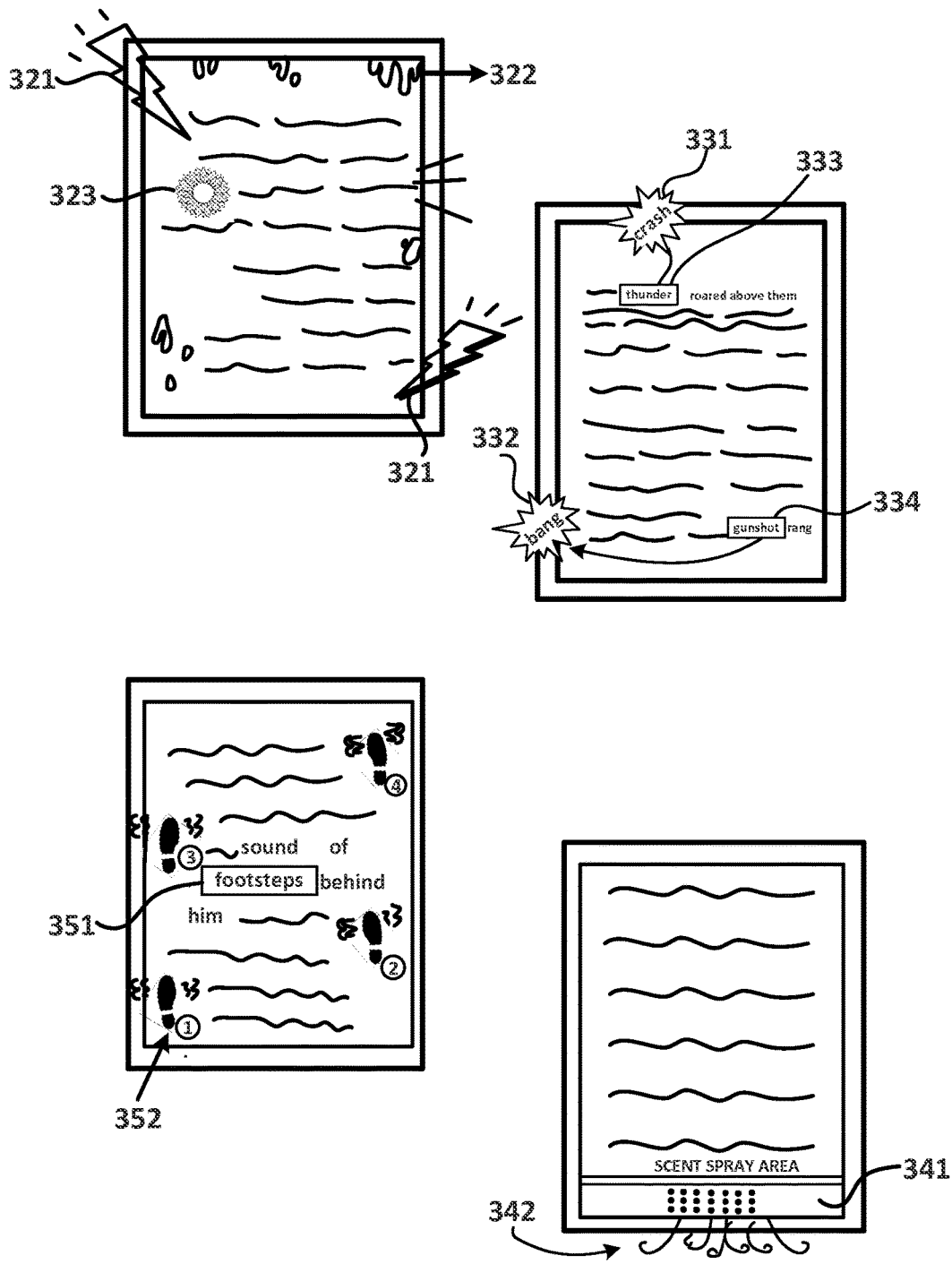

FIG. 3b shows a sound enhancement "crash" 331 that is produced in response to the user reading the trigger word 333 "thunder" and the enhancement sound 332 "bang" in response to the user reading the trigger word 334 "gunshot." The frequency and intensity of the sound can be adjusted by adjuster 380a of interface 300 in FIG. 3a.

With sight 320, when reaching the climax of horror novel (end of chapter or end of book) or when triggering a specific word such as "murder" or "blood," a faint red light or blotches of red light could begin pulsating behind the text.

FIG. 3b shows a visual enhancement lightning bolt 321 that is produced in response to the user reading a trigger word or could be generated based on the genre or context of a particular scene in the book. For example, blood 322 may drip down the screen during a murder mystery novel or bullet hole 323 may appear through the screen during a shoot-out scene.

With scent 340, while adding technology directly into a reading device designed to produce certain experience-enhancing scents would probably not warrant the added costs, users who want the option, could buy accessories with built-in scent sprays 342 that are sprayed out of a scent spry area 341 that could be triggered at certain moments in a book or made specific for different genres that could be part of the multi-layered sensory-driven reading experience feature.

With motion 350, a tactile feedback, such as the same technology that enables vibrate on mobile phones and tablets, users could choose to "enable touch enhanced" or "motion enhanced mode" and feel vibrations or other motions while reading. The vibrations can in one embodiment be used to induce the feeling of motion or to provide a motion experience to the user while reading. Like the sound option outlined above, specific words could trigger corresponding motions. When a user reads the word "boat" the device could perform a rolling movement (using vibrations) to help the reader feel like they're on the rolling ocean. When coming across the word 351 "footsteps" the user could feel alternating vibrations 352 moving up either side of the page little feet walking 352 up their device.

The frequency and intensity of the motion can be adjusted by adjuster 380b of interface 300 in FIG. 3b.

Figure 4:
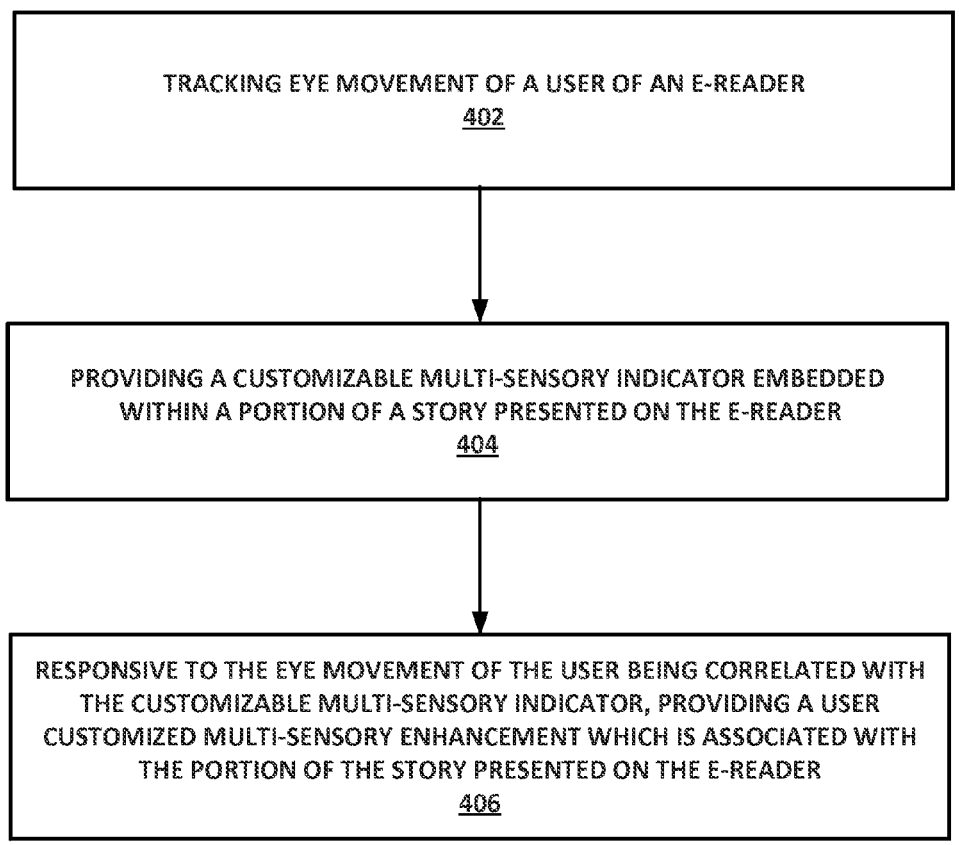
FIG. 4 illustrates a method for customizable multi-sensory enhanced e-reading, according to an embodiment.

Next with reference to FIG. 4, illustrated is a method 400 for providing a customizable multi-sensory enhancement to an E-reading experience, according to an embodiment. In describing the example of FIG. 4, reference will be made to components such as described with regard to FIGS. 1 through 3 for purposes of illustrating components for performing a step or sub-step as described.

At step 402, method 400 includes tracking eye movement of a user of an e-reader. Co-pending U.S. patent application Ser. No. 14/533,700, filed on Nov. 5, 2014, entitled "OPERATING AN ELECTRONIC PERSONAL DISPLAY USING EYE MOVEMENT TRACKING," by Liu, and assigned to the assignee of the present application and hereby incorporated by reference in its entirety provides details for tracking eye movement according to embodiments described herein.

At step 404, method 400 includes providing a customizable multi-sensory indicator embedded with a portion of a story presented on the e-reader. In one embodiment, a library containing customizable multi-sensory enhancements and corresponding trigger or indicator words is accessed when e-book content is loaded and when a user views particular trigger or indicator words or phrases, corresponding multi-sensory enhancements from the library can be accessed and presented to the user.

At 406, method 400 includes responsive to the eye movement of the user being correlated with the customizable multi-sensory indicator, providing a user customized multi-sensory enhancement which is associated with the portion of the story presented on the e-reader. In one embodiment, the indicator is a word or phrase on the page that is displayed on the e-reading device.

Example Computer System Environment

Figure 5:
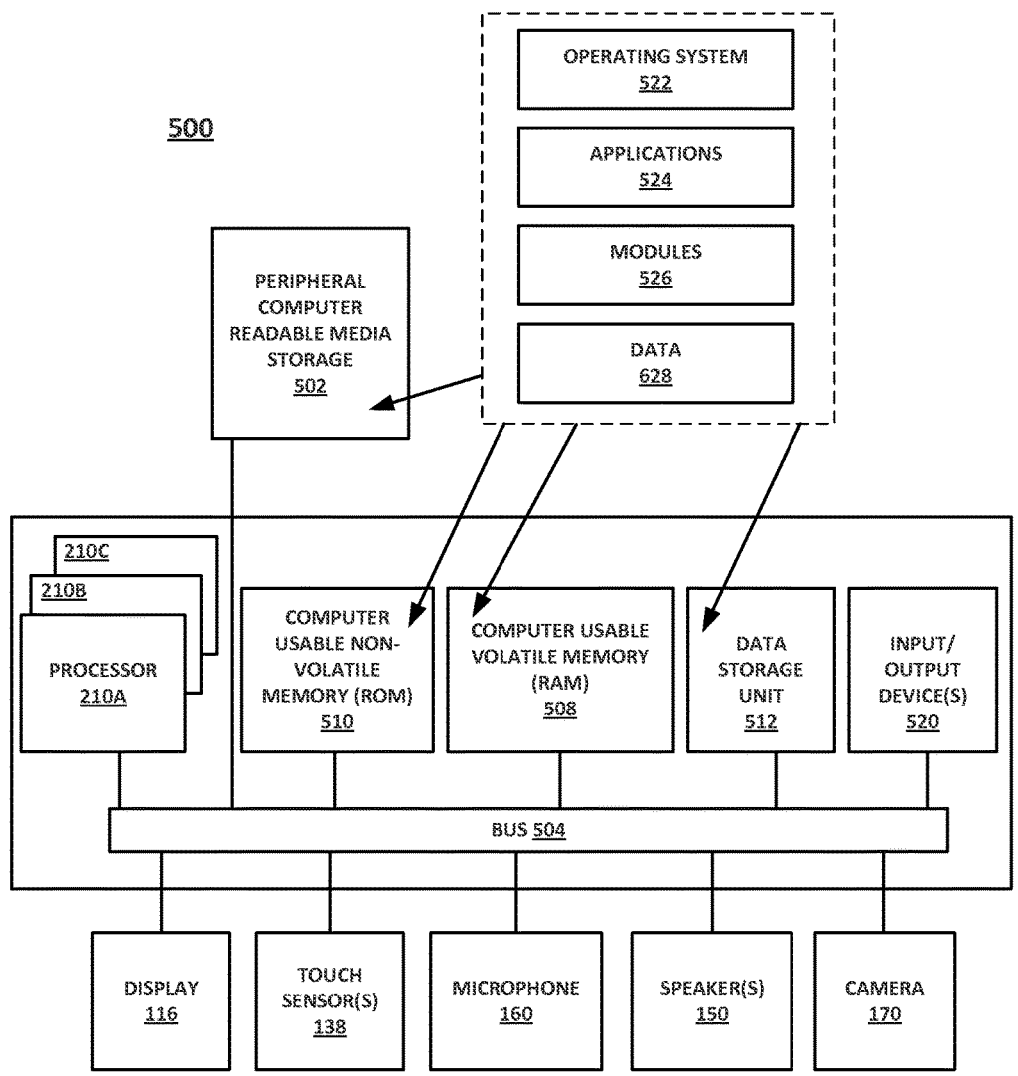
FIG. 5 illustrates an exemplary computer system for providing a customizable multi-sensory enhancement, according to an embodiment.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments of an e-Reader, such as e-Reader 110, which are discussed herein. It is appreciated that computer system 500 of FIG. 5 is only an example and that embodiments as described herein can operate on or within a number of different computer systems.

System 500 of FIG. 5 includes an address/data bus 504 for communicating information, and a processor 210A coupled to bus 504 for processing information and instructions. As depicted in FIG. 5, system 500 is also well suited to a multi-processor environment in which a plurality of processors 210A, 210B, and 210C are present. Processors 210A, 210B, and 210C may be any of various types of microprocessors. For example, in some multi-processor embodiments, one of the multiple processors may be a touch sensing processor and/or one of the processors may be a display processor. Conversely, system 500 is also well suited to having a single processor such as, for example, processor 210A.

System 500 also includes data storage features such as a computer usable volatile memory 508, e.g., random access memory (RAM), coupled to bus 504 for storing information and instructions for processors 210A, 210B, and 210C. System 500 also includes computer usable non-volatile memory 510, e.g., read only memory (ROM), coupled to bus 504 for storing static information and instructions for processors 210A, 210B, and 210C. Also present in system 500 is a data storage unit 512 (e.g., a magnetic or optical disk and disk drive) coupled to bus 504 for storing information and instructions.

Computer system 500 of FIG. 5 is well adapted to having peripheral computer-readable storage media 502 such as, for example, a floppy disk, a compact disc, digital versatile disc, universal serial bus "flash" drive, removable memory card, and the like coupled thereto. In some embodiments, computer-readable storage media 502 may be coupled with computer system 500 (e.g., to bus 504) by insertion into a removable a storage media slot.

System 500 also includes or couples with display 116 for visibly displaying information such as alphanumeric text and graphic images. In some embodiments, system 500 also includes or couples with one or more touch sensors 138 for communicating information, cursor control, gesture input, command selection, and/or other user input to processor 210A or one or more of the processors in a multi-processor embodiment. In some embodiments, system 500 also includes or couples with one or more optional speakers 150 for emitting audio output. In some embodiments, system 500 also includes or couples with an optional microphone 160 for receiving/capturing audio inputs. In some embodiments, system 500 also includes or couples with an optional digital camera 170 for receiving/capturing digital images as an input.

Optional touch sensor(s) 138 allows a user of computer system 500 (e.g., a user of an eReader of which computer system 500 is a part) to dynamically signal the movement of a visible symbol (cursor) on display 116 and indicate user selections of selectable items displayed. In some embodiment other implementations of a cursor control device and/or user input device may also be included to provide input to computer system 500, a variety of these are well known and include: trackballs, keypads, directional keys, and the like.

System 500 is also well suited to having a cursor directed or user input received by other means such as, for example, voice commands received via microphone 160. System 500 also includes input/output (I/O) devices 520 for coupling system 500 with external entities. For example, in one embodiment, I/O device 520 is a modem for enabling wired communications or modem and radio for enabling wireless communications between system 500 and an external device and/or external network such as, but not limited to, the Internet. I/O device 520 may include a short-range wireless radio such as a Bluetooth® radio, Wi-Fi radio (e.g., a radio compliant with Institute of Electrical and Electronics Engineers' (IEEE) 802.11 standards), or the like.

Referring still to FIG. 5, various other components are depicted for system 500. Specifically, when present, an operating system 522, applications 524, modules 526, and/or data 628 are shown as typically residing in one or some combination of computer usable volatile memory 508 (e.g., RAM), computer usable non-volatile memory 510 (e.g., ROM), and data storage unit 512. For example, modules 526 may include an application module for providing a page flipping mode for a user.

In some embodiments, all or portions of various embodiments described herein are stored, for example, as an application 524 and/or module 526 in memory locations within RAM 508, ROM 510, computer-readable storage media within data storage unit 512, peripheral computer-readable storage media 502, and/or other tangible computer readable storage media.

Although illustrative embodiments have been described in detail herein with reference to the accompanying drawings, variations to specific embodiments and details are contemplated and encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method of synchronizing multi-sensory enhancement with e-reading content, the method comprising:

tracking, using a camera, eye movement of a user of an e-reader;

providing a multi-sensory indicator embedded within a first portion of a story presented on the e-reader;

responsive to the eye movement of the user being correlated with the multi-sensory indicator, providing a user customized multi-sensory enhancement that is associated with the first portion of the story presented on the e-reader, wherein the user customized multi-sensory enhancement includes at least a tactile feedback enhancement, wherein a frequency of the tactile feedback enhancement includes a first range of more than two adjustable values and an intensity of the tactile feedback enhancement includes a second range of more than two adjustable values, and wherein the first range and the second range are adjustable through a user interface, wherein the user customized multi-sensory enhancement further includes a visual enhancement, and wherein providing the user customized multi-sensory enhancement that is associated with the first portion of the story presented on the e-reader includes simultaneously providing the tactile feedback enhancement and the visual enhancement, wherein the visual enhancement includes a variation of color in only a portion of a display screen of the e-reader, wherein the portion of the display screen includes text of the story, and wherein the variation of the color occurs in an overlapping manner with the text such that both the text and the variation in the color are visible to the user;

providing a new setting indicator embedded within a second portion of the story presented on the e-reader; and responsive to the eye movement of the user being correlated with the new setting indicator, removing said user customized multi-sensory enhancement.

2. The method as recited by claim 1, further comprising:
providing a background multi-sensory enhancement indicator embedded within a third portion of a story presented on the e-reader; and
responsive to the eye movement of the user being correlated with the background multi-sensory enhancement indicator, accessing a user customized multi-sensory enhancement file that is associated with the third portion of the story presented on the e-reader.

3. The method as recited by claim 1, further comprising:
providing a user momentary multi-sensory enhancement indicator embedded within a fourth portion of the story presented on the e-reader; and
responsive to the eye movement of the user being correlated with the user momentary multi-sensory enhancement indicator, accessing a user customized multi-sensory enhancement file associated with the fourth portion of the story presented on the e-reader.

4. The method as recited by claim 1, further comprising:
tracking the eye movement of the user at a line-by-line granularity.

5. The method as recited by claim 1, further comprising:
tracking the eye movement of the user at a word-by-word granularity.

6. The method as recited by claim 1, further comprising:
providing a user fade out indicator embedded within a fifth portion of a story presented on the e-reader; and
responsive to the eye movement of the user being correlated with the user fade out indicator, fading out the user customized multi-sensory enhancement.

7. The method as recited by claim 1, wherein the multi-sensory indicator is customizable.

8. The method of claim 1, wherein the user customized multi-sensory enhancement includes at least a sound enhancement and a motion enhancement, and wherein a frequency and an intensity of the sound enhancement is configured to be adjusted separately from a frequency and an intensity of the motion enhancement.

9. The method of claim 1, wherein the user customized multi-sensory enhancement further includes a sound enhancement, and wherein providing the user customized multi-sensory enhancement that is associated with the first portion of the story presented on the e-reader includes simultaneously providing both the tactile feedback enhancement and the sound enhancement.

10. The method of claim 9, wherein the user customized multi-sensory enhancement further includes a visual enhancement, and wherein providing the user customized multi-sensory enhancement that is associated with the first portion of the story presented on the e-reader includes simultaneously providing the tactile feedback enhancement, the sound enhancement, and the visual enhancement.

11. The method of claim 10, wherein the visual enhancement includes a variation of color in a portion of a display screen of the e-reader.

12. A system that synchronizes multi-sensory enhancement with e-reader content on an e-reader, the system comprising:
a camera configured to track an eye movement of a user of the e-reader; and
circuitry configured to:
correlate the eye movement of the user with a multi-sensory indicator embedded within a first portion of a story presented on the e-reader;
provide a user customized multi-sensory enhancement that is associated with the first portion of the story presented on the e-reader in response to the eye movement of the user being correlated with the multi-sensory indicator,
wherein the user customized multi-sensory enhancement includes at least a tactile feedback enhancement, wherein a frequency of the tactile feedback enhancement includes a first range of more than two adjustable values and an intensity of the tactile feedback enhancement includes a second range of more than two adjustable values, and wherein the first range and the second range are adjustable through a user interface,
wherein the user customized multi-sensory enhancement further includes a visual enhancement, and wherein providing the user customized multi-sensory enhancement that is associated with the first portion of the story presented on the e-reader includes simultaneously providing the tactile feedback enhancement and the visual enhancement, wherein the visual enhancement includes a variation of color in only a portion of a display screen of the e-reader, wherein the portion of the display screen includes text of the story, and wherein the variation of the color occurs in an overlapping manner with the text such that both the text and the variation in the color are visible to the user;
provide a new setting indicator embedded within a second portion of the story presented on the e-reader; and remove said user customized multi-sensory enhancement in response to the eye movement of the user being correlated with the new setting indicator.

13. The system of claim 12, wherein the multi-sensory indicator embedded within the first portion of the story is an animation with sound.

14. The system of claim 12, wherein the multi-sensory indicator embedded within the first portion of the story comprises a picture and a vibration command.

15. The system of claim 12, wherein the multi-sensory indicator embedded within the first portion of the story comprises a scent.

16. The system of claim 12, wherein the camera is configured to track the eye movement of the user of the e-reader at a line-by-line granularity.

17. The system of claim 12, wherein the camera is configured to track the eye movement of the user of the e-reader at a word-by-word granularity.

18. The system of claim 12, wherein the circuitry is further configured to:
correlate the eye movement of the user with a pre-defined fade out indicator region embedded within a third portion of the story presented on the e-reader; and
fade out the presentation of the user customized multi-sensory enhancement in response to the eye movement of the user being correlated with the pre-defined fade out indicator region.

19. The system of claim 12, wherein the multi-sensory indicator embedded within the first portion of the story presented on the e-reader is a stand-alone add on file for a pre-existing e-book file.

20. A non-transitory computer-readable storage medium storing instructions that, when executed by a hardware processor of a computing device, cause the hardware processor to perform a method of synchronizing multi-sensory enhancement with e-reading content, the method comprising:
tracking eye movement of a user of an e-reader with a camera of the e-reader;
providing a multi-sensory indicator embedded within a first portion of the story presented on the e-reader;
responsive to the eye movement of the user being correlated with the multi-sensory indicator, providing a user customized multi-sensory enhancement that is associated with the first portion of the story presented on the e-reader,
wherein the user customized multi-sensory enhancement includes at least a tactile feedback enhancement, wherein a frequency of the tactile feedback enhancement includes a first range of more than two adjustable values and an intensity of the tactile feedback enhancement includes a second range of more than two adjustable values, and wherein the first range and the second range are adjustable through a user interface,
wherein the user customized multi-sensory enhancement further includes a visual enhancement, and wherein providing the user customized multi-sensory enhancement that is associated with the first portion of the story presented on the e-reader includes simultaneously providing the tactile feedback enhancement and the visual enhancement, wherein the visual enhancement includes a variation of color in only a portion of a display screen of the e-reader, wherein the portion of the display screen includes text of the story, and wherein the variation of the color occurs in an overlapping manner with the text such that both the text and the variation in the color are visible to the user;
providing a new setting indicator embedded within a second portion of the story presented on the e-reader; and
responsive to the eye movement of the user being correlated with the new setting indicator, removing said user customized multi-sensory enhancement.

21. The non-transitory computer-readable storage medium as recited by claim 20, the method further comprising:
providing a pre-defined fade out indicator embedded within a third portion of the story presented on the e-reader; and
responsive to the eye movement of the user being correlated with the pre-defined fade out indicator, fading out the user customized multi-sensory enhancement.

22. The non-transitory computer-readable storage medium as recited by claim 20, the method further comprising:
tracking the eye movement of the user at a line-by-line granularity.

23. The non-transitory computer-readable storage medium as recited by claim 20, the method further comprising:
tracking the eye movement of the user at a word-by-word granularity.

* * * * *